US012172151B2

(12) United States Patent
Stalzer et al.

(10) Patent No.: US 12,172,151 B2
(45) Date of Patent: Dec. 24, 2024

(54) PROCESS AND MATERIALS FOR TRIM DEWAXING OF DISTILLATES

(71) Applicant: ExxonMobil Technology and Engineering Company, Annandale, NJ (US)

(72) Inventors: Madelyn Stalzer, Gainesville, FL (US); Joseph Gatt, Annandale, NJ (US); Chuansheng Bai, Phillipsburg, NJ (US); Christopher Oliveri, Bridgewater, NJ (US)

(73) Assignee: EXXONMOBIL TECHNOLOGY AND ENGINEERING COMPANY, Spring, TX (US)

( * ) Notice: Subject to any disclaimer, the term of this patent is extended or adjusted under 35 U.S.C. 154(b) by 91 days.

(21) Appl. No.: 18/000,735

(22) PCT Filed: May 12, 2021

(86) PCT No.: PCT/US2021/031927
§ 371 (c)(1),
(2) Date: Dec. 5, 2022

(87) PCT Pub. No.: WO2021/257207
PCT Pub. Date: Dec. 23, 2021

(65) Prior Publication Data
US 2023/0211328 A1    Jul. 6, 2023

Related U.S. Application Data

(60) Provisional application No. 63/040,294, filed on Jun. 17, 2020.

(51) Int. Cl.
*B01J 29/80* (2006.01)
*B01J 29/48* (2006.01)
(Continued)

(52) U.S. Cl.
CPC .............. *B01J 29/80* (2013.01); *B01J 29/48* (2013.01); *B01J 29/7261* (2013.01); *B01J 29/74* (2013.01);
(Continued)

(58) Field of Classification Search
CPC ........ B01J 29/80; B01J 29/48; B01J 29/7261; B01J 29/74; B01J 29/7861; B01J 29/7869;
(Continued)

(56) References Cited

U.S. PATENT DOCUMENTS 6,051,129 A      4/2000   Harris et al. ................... 208/138
7,449,421 B2   11/2008   Benazzi et al. ................. 502/67
(Continued)

OTHER PUBLICATIONS

IUPAC Periodic Table of the Elements, dated May 1, 2013, as it appears on the inside cover of The Merck Index, Twelfth Edition, Merck & Co., Inc., 1996, 1 page.

*Primary Examiner* — Randy Boyer
*Assistant Examiner* — Juan C Valencia
(74) *Attorney, Agent, or Firm* — Shook, Hardy & Bacon L.L.P.

(57) ABSTRACT

Described herein are novel and inventive dewaxing processes that employ dewaxing catalysts which are co-extrusions of two different zeolites, particularly two different 10MR zeolites or a co-extrusion of a 10MR zeolite and a 12MR zeolite in combination with a hydrogenation component. The hydrogenation component can be a mixture of non-noble metal components or a mixture of noble metal components. This novel and inventive process demonstrated a significant activity boost (as measured by increased cloud point reduction) and/or selectivity boost (as measured by reduced diesel loss) compared to either single zeolite component.

18 Claims, 4 Drawing Sheets

(51) Int. Cl.
  *B01J 29/72* (2006.01)
  *B01J 29/74* (2006.01)
  *B01J 29/78* (2006.01)
  *B01J 37/02* (2006.01)
  *B01J 37/04* (2006.01)
  *B01J 37/08* (2006.01)
  *B01J 37/20* (2006.01)
  *B01J 37/30* (2006.01)
  *C10G 45/64* (2006.01)
  *C10G 65/04* (2006.01)

(52) U.S. Cl.
  CPC ....... *B01J 29/7861* (2013.01); *B01J 29/7869* (2013.01); *B01J 29/7892* (2013.01); *B01J 37/0201* (2013.01); *B01J 37/04* (2013.01); *B01J 37/08* (2013.01); *B01J 37/20* (2013.01); *B01J 37/30* (2013.01); *C10G 45/64* (2013.01); *C10G 65/043* (2013.01); *B01J 2229/18* (2013.01); *C10G 2300/1048* (2013.01); *C10G 2300/4006* (2013.01); *C10G 2300/70* (2013.01); *C10G 2400/04* (2013.01)

(58) Field of Classification Search
  CPC .... B01J 29/7892; B01J 37/0201; B01J 37/04; B01J 37/08; B01J 37/20; B01J 37/30; B01J 2229/18; B01J 2229/20; B01J 37/0009; C10G 45/64; C10G 65/043; C10G 2300/1048; C10G 2300/4006; C10G 2300/70; C10G 2400/04; C10G 2300/304
  See application file for complete search history.

(56) References Cited

U.S. PATENT DOCUMENTS

| | | | |
|---|---|---|---|
| 8,298,403 B2 | 10/2012 | Elia et al. | 208/149 |
| 2007/0029230 A1* | 2/2007 | Maesen | C10G 45/64 208/134 |
| 2010/0147747 A1* | 6/2010 | Elia | B01J 29/80 502/67 |
| 2018/0318811 A1* | 11/2018 | Bai | B01J 37/0203 |

\* cited by examiner

PROCESS AND MATERIALS FOR TRIM DEWAXING OF DISTILLATES

RELATED APPLICATION

This application is a national stage filing of Patent Cooperation Treaty Application No. PCT/US2021/031927 filed May 12, 2021, which claims the benefit of U.S. Provisional Application No. 63/040,294, filed Jun. 17, 2020, entitled "Process And Materials For Trim Dewaxing Of Distillates" the entire contents of U.S. Provisional Application No. 63/040,294 are incorporated herein by reference.

FIELD OF THE INVENTION

This invention relates to processes and catalysts for dewaxing of hydrocarbon distillate boiling range feeds; particularly, but not exclusively, to such processes and catalysts to for dewaxing of distillate boiling range feeds suitable for diesel boiling point range products.

BACKGROUND OF THE INVENTION

Over the last few decades, worldwide diesel demand has grown and refineries and third party users are constrained by cold flow properties during production. In order to meet these requirements, many refineries are forced to blend down with kerosene or use additives to improve cold flow properties. These are often not cost-effective and are limited in their ability to change cold flow properties past a certain point.

One method for improving cold flow properties of distillate feeds is by dewaxing processes. Dewaxing is an established process for treating petroleum fractions so as to remove certain hydrocarbons, particularly straight chain and slightly branched chain waxy paraffins, which solidify readily. Dewaxing can be effected by solvent extraction and crystallization, but in recent years attention has focused on processes that remove waxes by selective catalytic conversion of the straight and slightly branched chain paraffins. In catalytic dewaxing processes, the waxy paraffins are (de) hydrogenated, cracked and/or isomerized into compounds which do not adversely affect the cold flow properties of the distillate product.

The key to an effective distillate catalytic dewaxing process is to isomerize these compounds without incurring yield losses due to (de)hydrogenation and/or cracking of the distillate to lighter products. An emerging application space for distillate dewaxing has been identified in trim sour service. These applications commonly share the need for a minor adjustment to product cloud, typically in the 3-15° C. range. The proposed scenarios typically call for the replacement of a small portion of the existing hydrotreating catalyst at the bottom bed of the reactor with the isomerization catalyst. The isomerization catalyst is generally composed of an acidic component (usually a zeolite) and a metal component. The metal component serves to (de)hydrogenate paraffins to olefins, which are then isomerized by the acid component. Traditionally, noble metals such as platinum are preferred due to their aptitude for (de)hydrogenation, though these materials typically suffer significant poisoning in the presence of sulfur in the distillate feed. Base metals (for example, non-noble metals), which are more resistant to this mode of poisoning, are preferred for sour service, as they are thought to also have some hydrotreating activity. Balancing the olefin production/(de)hydrogenation with olefin isomerization is crucial to formulating a catalyst with high activity and selectivity.

An example of such a process is disclosed in U.S. Pat. No. 8,298,403, which discloses a process for dewaxing a waxy component-containing hydrocarbon feedstock which comprising contacting the feedstock under dewaxing conditions with a catalyst system comprising ZSM-48 and a molecular sieve of the MTT framework type. The disclosed molecular sieves, ZSM-48 and ZSM-23, or a combination thereof, are selective for dewaxing by isomerization as opposed to cracking.

Despite these advances there remains a need for improved trim dewaxing processes for distillate boiling point range feed and the catalysts used therein; particularly, those processes and catalyst which exhibit a combination of high activity for increased cloud point reduction and increased selectivity for reduced diesel loss.

It has now been found that a dewaxing process that employs a dewaxing catalyst which is a co-extrusion of two different zeolites, particularly two different 10-membered ring framework (10MR) zeolites or a 10MR and a twelve-membered ring framework (12MR) zeolite in combination with a mixture of non-noble metal components or noble metal components meets these and other needs.

SUMMARY OF THE INVENTION

In one aspect, a process for trim dewaxing a distillate boiling range feed is disclosed. In this process, a dewaxing catalyst is employed that is a co-extrusion of two zeolites and employs first and second non-noble metals. This process can include the step of contacting at least a portion of a distillate boiling range feed with the dewaxing catalyst under effective dewaxing conditions to form a diesel boiling range product. The dewaxing catalyst may include either (a) a co-extrusion of two different 10-membered ring framework (10MR) zeolites; or (b) a co-extrusion of a 10MR zeolite and a 12-membered ring framework (12MR) zeolite, and a non-noble metal component. The non-noble metal component can be a combination of metals, for example, (c) a first metal selected from the group consisting of nickel, cobalt and mixtures thereof; and (b) a second metal selected from the group consisting of chromium, molybdenum, tungsten and mixtures thereof.

In another aspect, another process for trim dewaxing a distillate boiling range feed is disclosed. In this process, the dewaxing catalyst is also a co-extrusion of two zeolites but it employs a noble metal. The process can include the step of contacting at least a portion of a distillate boiling range feed with a dewaxing catalyst under effective dewaxing conditions to form an a diesel boiling range product. The dewaxing catalyst may include (a) a co-extrusion of two different 10MR zeolites; or (b) a co-extrusion of a 10MR zeolite and a 12MR zeolite; and can optionally include one or more noble metals. Such as (c) a noble metal selected from the group consisting of palladium, platinum and mixtures thereof.

Conveniently, the 10MR zeolite can have a framework type selected from the group consisting of EUO, MEL, MFI, MFS, MRE, MTT, MWW, MWW, NES, TON and mixtures thereof. The 10MR zeolites of these frameworks can be selected from the group consisting of ZSM-50, EU-1, ZSM-11, ZSM-5, ZSM-57, ZSM-48, ZSM-23, EMM-10, EMM-12, EMM-13, MCM-22, MCM-36, MCM-49, MCM-56, NU-87, ZSM-22, Theta-1, and mixtures thereof.

Conveniently, the 12MR zeolite can have a framework type selected from the group consisting of *BEA, BEC, EMT, FAU, LTL, MEI, MOR, MOZ, MTW, MSE, OFF and mixtures thereof. The 12MR zeolite of these frameworks can be selected from the group consisting of beta, ZSM-2, ZSM-3, ZSM-20, Y, US-Y, L, ZSM-18, mordenite, ZSM-10, ZSM-12, MCM-68, offretite, and mixtures thereof.

In still another aspect, a method of forming a dewaxing catalyst is provided. The method includes a number of steps. A mixture which comprises a first zeolite, a second zeolite and a binder is formed. The mixture is mulled to form an extrudable paste, which is extruded to form an extrudate that is dried. The dried extrudate is impregnated with a solution comprising a source of a Group 6 metal ion, a source of a Group 10 metal ion, and optionally a dispersion agent to form a metal-containing extrudate. The metal-containing extrudate is dried at a temperature of about 80° C. to about 200° C. to form a dewaxing catalyst. Optionally, the dewaxing catalyst is exchanged with a source of ammonium ions, washed with water, dried and calcined.

In still yet another embodiment, a catalyst for trim dewaxing a distillate boiling point range feed is provided. The catalyst can be (a) a co-extrusion of two different 10MR zeolites; or (b) a co-extrusion of a 10MR zeolite and a 12MR zeolite; and optionally, (c) a noble metal selected from the group consisting of palladium, platinum and mixtures thereof.

Conveniently, the catalyst can include at least one of: (a) ZSM-11, ZSM-48, nickel and molybdenum; or (b) ZSM-48, ZSM-23, nickel and molybdenum; or (c) ZSM-48, ZSM-12, nickel and molybdenum.

DETAILED DESCRIPTION OF THE INVENTION

Overview

Figure 1:
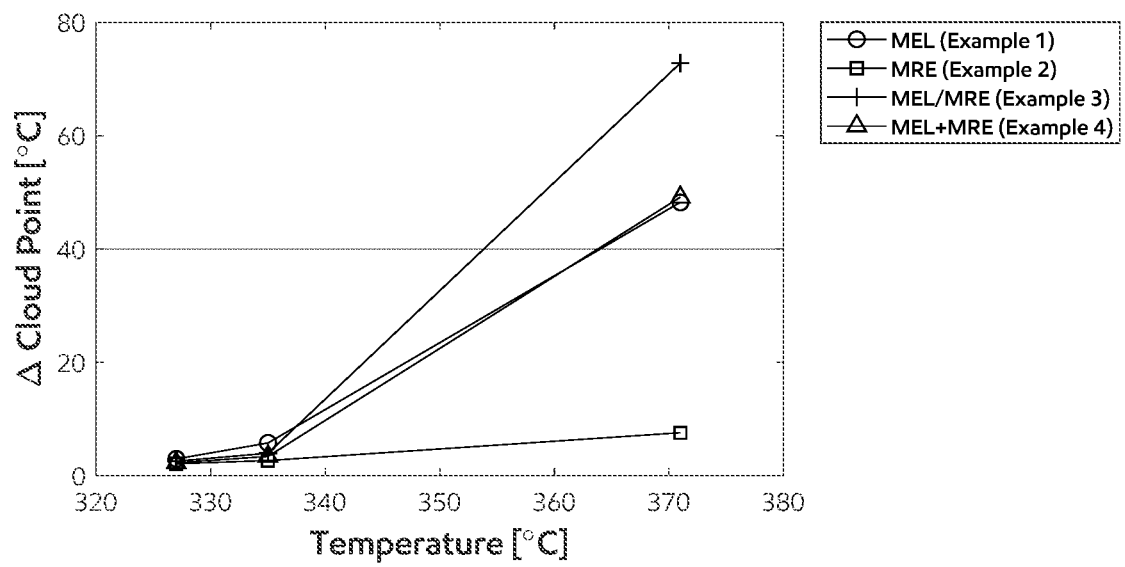
FIG. 1 shows the cloud point reduction performance of materials containing MEL and MRE (10MR) frameworks over a range of temperatures.

Described herein are novel and inventive dewaxing processes that employ dewaxing catalysts which are co-extrusions of two different zeolites, particularly two different 10MR zeolites or a co-extrusion of a 10MR zeolite and a 12MR zeolite in combination with a hydrogenation component. The hydrogenation component can be a mixture of non-noble metal components or a mixture of noble metal components. This novel and inventive process demonstrated a significant activity boost (as measured by increased cloud point reduction) and/or selectivity boost (as measured by reduced diesel loss) compared to either single zeolite component. Surprisingly, co-extruded materials also demonstrate higher activity and selectivity than physically mixing separate zeolite components. The ability to increase cloud point reduction by co-extruding materials with a metal component has been shown across a range of zeolite frameworks, including a co-extrusion of differing 10MR frameworks, such as for example, MRE, MEL, MTT; also the increased cloud point reduction is shown with a co-extrusion of such 10MR zeolites and 12 MR zeolite, such as for example, MTW. This performance advantage for coextruded materials is also demonstrated across different feeds.

Definitions

The term "framework type", as used herein, has the meaning described in the "Atlas of Zeolite Framework Types," by Ch. Baerlocher, W. M. Meier and D. H. Olson (Elsevier, 5th Ed., 2001).

As used herein, the term "zeolite" is used interchangeably with the term "molecular sieve".

As used herein, the term "Periodic Table" means the IUPAC Periodic Table of the Elements, dated 1 May 2013, as it appears on the inside cover of The Merck Index, Twelfth Edition, Merck & Co., Inc., 1996.

Distillate Feeds

The feedstocks (or feeds) that can be dewaxed using the dewaxing catalyst of the present invention. Such feedstocks range from relatively light distillate fractions such as kerosene and jet fuel up to high boiling stocks such as whole crude petroleum, reduced crudes, vacuum tower residue, cycle oils, synthetic crudes (for example, shale oils, tars and oil, etc.), gas oils, vacuum gas oils, foots oils, Fischer-Tropsch derived waxes, and other heavy oils. Straight chain n-paraffins either alone or with only slightly branched chain paraffins having 16 or more carbon atoms are sometimes referred to as waxes. The feedstock will often be a $C_{10+}$ feedstock generally boiling above about 350° F. (177° C.), since lighter oils will usually be free of significant quantities of waxy components. However, the dewaxing catalyst is particularly useful with waxy distillate stocks such as middle distillate stocks including gas oils, kerosenes, and jet fuels, lubricating oil stocks, heating oils and other distillate fractions whose pour point and viscosity need to be maintained within certain specification limits. Lubricating oil stocks will generally boil above 230° C. (450° F.), more usually above 315° C. (600° F.). Hydroprocessed stocks are a convenient source of stocks of this kind and also of other distillate fractions since they normally contain significant amounts of waxy n-paraffins. The feedstock will normally be a $C_{10+}$ feedstock containing paraffins, olefins, naphthenes, aromatic and heterocyclic compounds and with a substantial proportion of higher molecular weight n-paraffins and slightly branched paraffins which contribute to the waxy nature of the feedstock. During the processing, the n-paraffins are isomerized to branched paraffins but also undergo some cracking or hydrocracking to form liquid range materials which contribute to a low viscosity product. The degree of cracking which occurs is, however, limited so that the yield of products having boiling points below that of the feedstock is reduced, thereby preserving the economic value of the feedstock.

Dewaxing Catalyst

In various aspects, at least a portion of the dewaxing catalyst of this invention includes a co-extrusion of two different 10-membered ring zeolites and a non-noble metal hydrogenation component. The non-noble metal hydrogenation component includes a first metal and a second metal. The first metal can be selected from the group consisting of nickel, cobalt and mixtures thereof, preferably, nickel or cobalt. The second metal can be selected to from the group consisting of chromium, molybdenum, tungsten and mixtures thereof, preferably, molybdenum and tungsten.

In other aspects, at least a portion of the dewaxing catalyst of this invention includes a co-extrusion of a 10-membered ring zeolite and a 12 membered ring zeolite and a noble metal hydrogenation component. The noble metal hydrogenation component can be selected from the group consisting of palladium, platinum and mixtures thereof, preferably platinum.

The molecular sieves having 10MR framework that are suitable for the dewaxing catalysts of this invention can include molecular sieves such as crystalline aluminosilicates (for example, zeolites).

In one or more embodiments, the 10MR frameworks can comprise, consist essentially of, or be a framework type that includes, but are not limited to, and selected from the group consisting of EUO, MEL, MFI, MFS, MRE, MTT, MWW, MWW, NES, TON and mixtures thereof. Zeolites which have such 10MR frameworks include, but are not limited to, ZSM-50, EU-1 (EUO), ZSM-11 (MEL), ZSM-5 (MFI), ZSM-57 (MFS), ZSM-48 (MRE), ZSM-23 (MTT), EMM-10, MCM-22, MCM-49, MCM-56 (MWW), NU-87 (NES), ZSM-22, Theta-1 (TON) and mixtures thereof. Note that a zeolite having the ZSM-23 structure with a silica to alumina ratio from ~20:1 to ~40:1 can sometimes be referred to as SSZ-32.

In one or more embodiments, the 12MR frameworks can comprise, consist essentially of, or be a framework type that includes, but are not limited to, and selected from the group consisting of *BEA, BEC, EMT, FAU, LTL, MEI, MOR, MOZ, MTW, MSE, OFF and mixtures thereof. Zeolites which have such 12MR zeolites include, but are not limited to Beta (BEA and BEC), ZSM-2, ZSM-3, ZSM-20 (EMT), Y, US-Y (FAU), zeolite L (LTL), ZSM-18 (MEI), mordenite (MOR), ZSM-10 (MOZ), ZSM-12 (MTW), MCM-68 (MSE), Offretite (OFF) and mixtures thereof.

Optionally, one, or more preferably both, of the molecular sieves employed in the present dewaxing catalyst and process may also be combined with another material resistant to the temperatures and other conditions employed in the dewaxing process. Such materials may be referred to as a binder or matrix material. Such binder or matrix material include active and inactive materials and synthetic or naturally occurring zeolites as well as inorganic materials such as clays, silica and/or metal oxides, for example alumina, titania and/or zirconia. Preferably, the dewaxing catalyst (as bound) optionally has a ratio of zeolite to binder by weight of at least about 1.2, for example, at least about 2.0, at least about 4.0, or at least about 4.5.

The latter may be either naturally occurring or in the form of gelatinous precipitates, sols or gels including mixtures of silica and metal oxides. Use of a material in conjunction with the/or each molecular sieve, i.e. combined therewith, which is active, may enhance the conversion and/or selectivity of the catalyst in certain organic conversion processes.

Inactive materials suitably serve as diluents to control the amount of conversion in the process so that products can be obtained economically and orderly without employing other means for controlling the rate or reaction. Frequently, crystalline catalytic materials have been incorporated into naturally occurring clays, for example bentonite and kaolin. These materials, i.e. clays, oxides, etc., function, in part, as binders for the catalyst. It is desirable to provide a catalyst having good crush strength because in practice the catalyst is often subjected to rough handling, which tends to break the catalyst down into powder-like materials which cause problems in processing.

Naturally occurring clays which can be composited with the or each molecular sieve employed herein include the montmorillonite and kaolin families which include the sub-bentonites, and the kaolins commonly known as Dixie, McNamee, Georgia and Florida clays, or others in which the main mineral constituent is halloysite, kaolinite, dickite, nacrite or anauxite. Such clays can be used in the raw state as originally mined or initially subjected to calcination, acid treatment or chemical modification.

In addition to the foregoing materials, the present molecular sieves can be composited with a porous matrix material such as silica-alumina, silica-magnesia, silica-zirconia, silica-thoria, silica-beryllia, silica-titania, as well as ternary compositions such as silica-alumina-thoria, silica-alumina-zirconia, silica-alumina-magnesia and silica-magnesia-zirconia. The matrix can be in the form of a cogel. A mixture of these components can also be used. Preferably, the binder is alumina.

The relative proportions of zeolite (or molecular sieve) and matrix in each of the individual zeolites which make up the co-extruded dewaxing catalyst may vary widely. For each zeolite and matrix of the co-extrusion, the zeolite content can range anywhere from about 1 to about 90 percent by weight, and more usually in the range of about 2 to about 80 percent by weight of the composite. Preferred proportions of zeolite/matrix in the individual zeolites in the co-extruded catalyst are 65/35 or 80/20 based on the total weight of the individual zeolite.

The relative proportions of the $1^{st}$ zeolite to the $2^{nd}$ zeolite can also vary. The ratio of the $1^{st}$ zeolite to the $2^{nd}$ zeolite can be at least about 25:75, or at least about 50:50, or at least about 65:35, or at least about 75:25, or at least about 85:15, or at least about 90:10. The ratio of the $1^{st}$ zeolite to the $2^{nd}$ zeolite can also be about 98:2 or less, or about 95:5 or less, or about 90:10 or less, or about 85:15 or less, or about 75:25 or less. Preferred combinations of 10MR/matrix or 10MR and 12MR/matrix molecular sieve involve having at least about a 75:25 ratio.

The relative proportions of each zeolite and matrix material of the co-extruded dewaxing catalyst may also vary widely. The weight ratio of $1^{st}$ zeolite to the $2^{nd}$ zeolite to the matrix ratio of the co-extruded dewaxing catalyst can be from 15/65/20 or 40/40/20 or 70/15/15 based on the total weight of the dewaxing catalyst.

The amount of metal in the dewaxing catalyst can be at least 0.1 wt % based on catalyst weight, for example, at least 0.15 wt %, at least 0.2 wt %, at least 0.25 wt %, at least 0.3 wt %, or at least 0.5 wt %. The amount of metal in the catalyst can additionally or alternatively be 20 wt % or less based on catalyst weight, for example, 10 wt % or less, 5 wt % or less, 2.5 wt % or less, or 1 wt % or less. For aspects where the metal is Pt, Pd, another Group 8 noble metal, or a combination thereof, the amount of metal can be from 0.1 to 5 wt %, for example, from 0.1 to 2 wt %, from 0.25 to 1.8 wt %, or from 0.4 to 1.5 wt %. For embodiments where the metal is a combination of a non-noble Group 8 metal with a Group 6 metal, the combined amount of metal can be from 0.5 wt % to 25 wt %, for example, from 2 wt % to 20 wt % or from 5 wt % to 18 wt %.

In one or more embodiments, the catalyst for trim dewaxing a distillate boiling range feed, comprises a co-extrusion of two different 10-membered ring zeolites and a non-noble metal component which comprises a first metal and a second metal, the first metal selected from the group consisting of nickel, cobalt and mixtures thereof; and a second metal selected from the group consisting of chromium, molybdenum, tungsten and mixtures thereof.

In another embodiment, the catalyst for trim dewaxing a distillate boiling range feed, comprises a co-extrusion of a 10-membered ring zeolite and a 12-membered ring zeolite and a non-noble metal component which comprises a first metal and a second metal, the first metal selected from the group consisting of nickel, cobalt and mixtures thereof, preferably nickel or cobalt; and a second metal selected from the group consisting of chromium, molybdenum, tungsten and mixtures thereof, preferably molybdenum.

In one or more embodiments, the catalyst for trim dewaxing a distillate boiling range feed, comprises a co-extrusion of two different 10-membered ring zeolites and a noble metal selected from the group consisting of palladium, platinum and mixtures thereof, preferably platinum.

In another embodiment, the catalyst for trim dewaxing a distillate boiling range feed, comprises a co-extrusion of a 10-membered ring zeolite and a 12-membered ring zeolite and a noble metal selected from the group consisting of palladium, platinum and mixtures thereof.

In one or more embodiments, the catalyst for trim dewaxing of a distillate boiling point feed comprises a co-extrusion of different 10MRs of ZSM-11 and ZSM-48 or a co-extrusion of a 10MR and a 12MR of ZSM-23 and ZSM-48. In some embodiments, the non-noble metals are cobalt and molybdenum, or preferably, nickel and molybdenum.

In one or more embodiments, the catalyst for trim dewaxing of a distillate boiling point feed comprises a co-extrusion of different 10MRs of ZSM-11 and ZSM-48 or a co-extrusion of a 10MR and a 12MR of ZSM-23 and ZSM-48. In some embodiments, the noble metal is palladium, preferably platinum.

Method of Making Dewaxing Catalyst

The method of making or forming the dewaxing catalyst includes a number of steps. The method includes or comprises forming a mixture of zeolites which comprises a first zeolite, a second zeolite and optionally, a binder or support material. The zeolites can be combined with binder in any convenient manner. In one embodiment, the bound dewaxing catalyst can be produced by starting with powders of both the zeolite and binder, combining and mulling the powders with added water to form a mixture, and then extruding the mixture to produce a bound catalyst of a desired size. Optionally, extrusion agents/aids can also be used to modify the extrusion flow properties of the zeolite and binder mixture.

In another embodiment, the mixture of zeolites can be mulled (with or without additional water) in a muller or other mixing device to form an extrudable paste. The extrudable paste can be extruded (with or without an extrusion aid) to form an extrudate. The extrudate can be dried at a temperature of about 80° C. to about 200° C. to form a dried extrudate. The dried extrudate can be treated (using one or more methods described below) to add the hydrogenation component, such as, for example, with a solution comprising a source of a Group 6 metal ion of the Periodic Table, a source of a Group 10 metal ion of the Periodic Table, and optionally a dispersion agent to form a metal-containing extrudate. The metal-containing extrudate can be dried at a temperature of about 80° C. to about 200° C. to form a dewaxing catalyst.

For example, in the case of platinum, such components can be impregnated in or on each molecular sieve by treating the material with a platinum metal-containing ion. Suitable platinum compounds for this purpose include chloroplatinic acid, platinous chloride and various compounds containing the platinum amine complex. Combinations of metals and methods for their introduction can also be used.

In one or more embodiments, the zeolite mixture can include water and/or have a solids content of the extrudable paste is from about 45% to 55% by weight.

Optionally, the zeolite mixture can include an extrusion aid, which can include, comprise or consist of or be selected from the group consisting of tetraethylammonium hydroxide, citric acid, sodium hydroxide, nitric acid, Methocel™, and mixtures thereof.

The metal hydrogenation component may be added to an additional catalyst in any convenient manner Such components can be exchanged into the composition, impregnated therein or physically intimately admixed therewith.

One technique for adding the metal hydrogenation component can be by incipient wetness. For example, after combining a zeolite and a binder, the combined zeolite and binder can be extruded into catalyst particles. These catalyst particles can then be exposed to a solution containing a suitable metal precursor. Alternatively, metal can be added to the catalyst by ion exchange, where a metal precursor can be added to a mixture of zeolite (or of zeolite and binder) prior to extrusion.

In some embodiments, metal hydrogenation component can be added to the catalyst particles by impregnation. Optionally, when the catalyst particles are impregnated with a base metal salt, the catalyst particles can be impregnated using a solution that can also include a dispersion agent/aid.

Impregnation, such as impregnation by incipient wetness and/or ion exchange in solution, can be a commonly used technique for introducing metals into a catalyst that includes a support. During impregnation, a support is typically exposed to a solution containing a salt of the metal for impregnation. There are many variables that can affect the dispersion of the metal salt during impregnation, including the concentration of the salt, the pH of the salt solution, the point of zero charge of the support material, but not excluding other variables that may also be important, for example, during incipient wetness and/or ion exchange impregnation. Multiple exposure steps can optionally be performed to achieve a desired metals loading on a catalyst. After impregnating a support with an aqueous metal salt, the support can be dried to remove excess water. The drying can be performed under any convenient atmosphere, such as air, at a temperature from about 80° C. to about 200° C. Optionally but preferably, when a dispersing agent/aid is included in the impregnation solution, the catalyst particles can remain uncalcined prior to sulfidation. Otherwise, the catalyst particles can be calcined at a temperature of about 250° C. to about 550° C. after impregnation.

In addition to water soluble metal salts, the impregnation solution may include one or more dispersion agents/aids. The dispersion agent is used to meek the metal isolated in the dewaxing catalyst. A dispersion agent/aid can include or be an organic compound comprising 2 to 10 carbons and can have a ratio of carbon atoms to oxygen atoms of about 2 to about 0.6. Optionally, the dispersion agent/aid can include or be a carboxylic acid. Examples of suitable dispersion agents/aids can include glycols (for example, ethylene glycol) and carboxylic acids, such as citric acid and gluconic acid. Optionally, the dispersion agent/aid can include/be an amine or other nitrogen-containing compound, such as nitrilotriacetic acid. Without being bound by any particular theory, it is believed that the dispersion agent/aid can be removed from the catalyst during the heating and/or calcination steps performed after impregnation to form metal oxides from the metal salts.

The amount of dispersion agent/aid in the impregnation solution can be selected based on the amount of metal in the solution. In some aspects, the molar ratio of dispersion agent/aid to total metals in the solution can be about 0.1 to about 5.0, for example, about 0.1 to about 2.0, about 0.1 to about 1.0, about 0.2 to about 5.0, about 0.2 to about 2.0, about 0.2 to about 1.0, about 0.3 to about 5.0, about 0.3 to about 2.0, about 0.3 to about 1.0, about 0.4 to about 5.0, about 0.4 to about 2.0, or about 0.4 to about 1.0 or about 2. Additionally or alternatively, for aspects where a non-noble Group 8 metal of the Periodic Table is present in the impregnation solution, the molar ratio of dispersion agent/aid to non-noble Group 8 metal of the Periodic Table can be about 0.5 to about 10, for example, about 0.5 to about 5.0, about 0.5 to about 3.0, about 1.0 to about 10, about 1.0 to about 5.0, or about 1.0 to about 3.0.

After forming a dewaxing catalyst with supported non-noble base metals and noble base metals, the base metals may be sulfided prior to use to form a sulfided base metal catalyst. The sulfidation of the metals can be performed by any convenient method, such as gas phase sulfidation and/or liquid phase sulfidation. Sulfidation can generally be carried out by contacting a catalyst including metal oxides with a sulfur containing compound, such as elemental sulfur, hydrogen sulfide, and/or a polysulfide. Hydrogen sulfide can be a convenient sulfidation agent for gas phase sulfidation, and can be incorporated into a gas phase sulfidation atmosphere containing hydrogen in an amount of about 0.1 wt % to 10 wt %. Sulfidation can additionally or alternatively be carried out in the liquid phase utilizing a combination of a polysulfide, such as a dimethyl disulfide spiked hydrocarbon stream, and hydrogen. The sulfidation can be performed at any convenient sulfidation temperature, such as from 150° C. to 500° C. The sulfidation can be performed at a convenient sulfidation pressure, such as from 100 psig to 1000 psig or more. The sulfidation time can vary depending on the sulfidation conditions, such that sulfidation times of 1 hour to 72 hours can often be suitable. The catalyst may be further steamed prior to use, if desired.

Catalytic Dewaxing Process

The catalytic dewaxing process of this invention for trim dewaxing a distillate boiling range feed, includes or comprising the step of contacting at least a portion of a distillate boiling range feed with any of the dewaxing catalyst of this invention under effective treatment conditions.

The process treatment conditions in the catalytic dewaxing zone in the process can include a temperature of 200° C. to 450° C., for example, 270° C. to 400° C. Optionally, a hydrogen co-feed can be included at a hydrogen partial pressure of 1.8 MPag to 35 MPag (250 psig to 5000 psig), for example, 4.9 MPag to 20.9 MPag, and a hydrogen treat gas rate of 34 Nm$^3$/m$^3$ (~200 SCF/B) to 1700 Nm$^3$/m$^3$ (~10000 scf/B), for example, 170 Nm$^3$/m$^3$ (~4000 SCF/B) to 850 Nm$^3$/m$^3$ (~5000 SCF/B). In still other embodiments, the conditions can include temperatures in the range of 600° F. (343° C.) to 815° F. (435° C.), hydrogen partial pressures of 500 psig to 3000 psig (3.5 MPag to 20.9 MPag), and hydrogen treat gas rates of 200 Nm$^3$/m$^3$ to 1020 Nm$^3$/m$^3$ (~1200 SCF/B to ~6000 SCF/B). These latter conditions may be suitable, for example, if the dewaxing stage is operating under sour conditions. The liquid hourly space velocity (LHSV) can be from 0.2 h$^{-1}$ to 10 h$^{-1}$, such as from 0.5 h$^{-1}$ to 5 h$^{-1}$ and/or from 1 h$^{-1}$ to 4 h$^{-1}$.

Additionally or alternatively, the conditions for dewaxing can be selected based on the conditions for a preceding reaction in the stage, such as hydrocracking conditions and/or hydrotreating conditions. Such conditions can be further modified using a quench between previous catalyst bed(s) and the bed for the dewaxing catalyst. Instead of operating the dewaxing process at a temperature corresponding to the exit temperature of the prior catalyst bed, a quench can be used to reduce the temperature for the hydrocarbon stream at the beginning of the dewaxing catalyst bed. One option can be to use a quench to have a temperature at the beginning of the dewaxing catalyst bed that is the same as the outlet temperature of the prior catalyst bed. Another option can be to use a quench to have a temperature at the beginning of the dewaxing catalyst bed at least 10° F. (6° C.) lower than the prior catalyst bed, for example, at least 20° F. (11° C.) lower, at least 30° F. (16° C.) lower, or at least 40° F. (21° C.) lower, optionally up to 150° F. (90° C.) lower.

In one embodiment, the dewaxing catalyst of this invention can be included in the same stage and/or the same reactor and/or the same bed as a hydrotreating catalyst. Such dewaxing catalyst can be mixed with the hydrotreating catalyst and/or such dewaxing catalyst can be downstream (within the same bed or in a different bed) relative to at least a portion of the hydrotreating catalyst or relative to substantially all of the hydrotreating catalyst.

In other embodiments, such dewaxing catalyst can be located in a bed downstream from any hydrocracking catalyst stages and/or any hydrocracking catalyst present in a stage.

Hydrotreating the distillate boiling range feed to the dewaxing process can allow the dewaxing to occur on molecules that have already been hydrotreated or hydrocracked to remove a significant fraction of organic sulfur- and nitrogen-containing species. Such hydrotreating the distillate feed can reduce poisoning of the dewaxing catalyst and increase it cycle length. The dewaxing catalyst can be located in the same reactor as at least a portion of the hydrocracking catalyst in a stage. Alternatively, the effluent from a reactor containing hydrocracking catalyst, possibly after a gas-liquid separation, can be fed into a separate stage or reactor containing the dewaxing catalyst. In still other aspects, dewaxing catalyst can be used in a catalyst bed prior to (i.e., upstream relative to the process flow) at least one bed of hydrotreating and/or hydrocracking catalyst.

As still another option, the dewaxing catalyst in the final reaction stage can be mixed with another type of catalyst, such as hydrotreating catalyst, in at least one bed in a reactor. As yet another option, a hydrocracking catalyst and a dewaxing catalyst can be co-extruded with a single binder to form a mixed functionality catalyst.

Hydrotreatment Process

Hydrotreatment can typically be used to reduce the sulfur, nitrogen, and aromatic content of a feed. The catalysts used for hydrotreatment can include conventional hydroprocessing catalysts, for example those that comprise at least one non-noble metal (Columns 8-10 of the Periodic Table), such as Fe, Co, and/or Ni, for instance at least Co and/or Ni; and at least one Group 6 metal, such as Mo and/or W. Such hydroprocessing catalysts can optionally include transition metal sulfides impregnated or dispersed on a refractory support/carrier such as alumina and/or silica. The support/carrier itself can typically have little or no significant/measurable catalytic activity. Substantially carrier- or support-free catalysts, commonly referred to as bulk catalysts, can generally have higher volumetric activities than their supported counterparts.

The hydrotreatment can advantageously be carried out in the presence of hydrogen. A hydrogen stream can, therefore, be fed or injected into a vessel/reaction zone/hydroprocessing zone where hydroprocessing catalyst is located. Hydrogen, contained in a hydrogen "treat gas," can be provided to the reaction zone. Treat gas can be either pure hydrogen or a hydrogen-containing gas, including hydrogen in an amount sufficient for the intended reaction(s), optionally including one or more other gases (for example, nitrogen and/or light hydrocarbons such as methane), which should ideally not adversely interfere with/affect either the reactions or the products. Impurities, such as $H_2S$ and $NH_3$, can be undesirable and can typically be removed from the treat gas before it is conducted to the reactor. In aspects where the treat gas stream introduced into a reaction stage contains components other than hydrogen, the treat gas can contain at least 50 vol % $H_2$, for example, at least 75 vol %, at least 90 vol %, at least 95 vol %, or at least 99 vol %.

Hydrogen can be supplied at a rate from 100 SCF/B (standard cubic feet of hydrogen per barrel of feed) (~17 $Nm^3/m^3$) to 1500 SCF/B (~250 $Nm^3/m^3$). In certain embodiments, the hydrogen can be provided in a range from 200 SCF/B (~34 $Nm^3/m^3$) to 1200 SCF/B (~200 $Nm^3/m^3$). Hydrogen can be supplied co-currently with the input feed to the hydrotreatment reactor/reaction zone and/or separately via a separate gas conduit to the hydrotreatment zone.

Hydrotreating conditions can include temperatures of 200° C. to 450° C., such as 315° C. to 425° C., pressures of 250 psig (~1.8 MPag) to 5000 psig (~35 MPag), such as 300 psig (~2.1 MPag) to 3000 psig (~20.9 MPag), liquid hourly space velocities (LHSV) of $0.1\ hr^{-1}$ to $10\ hr^{-1}$, and hydrogen treat rates of 200 scf/B (~34 $Nm^3/m^3$) to 10000 scf/B (1700 $Nm^3/m^3$), such as 500 scf/B (~85 $Nm^3/m^3$) to 10000 scf/B (1700 $Nm^3/m^3$).

The invention will now be more particularly described with reference to the Examples and the accompanying drawings. In the following examples, the benefit of using two different 10MR catalyst or a 10MR and 12MR framework catalysts is shown for production of diesel boiling range products.

EXAMPLES

Example 1: 3.4% Ni/14% Mo, 65/35 ZSM-11/Al$_2$O$_3$ (MEL)

Sixty-five (65) parts ZSM-11 crystal were mixed with 35 parts alumina (Versal 300™ obtainable from Honeywell UOP) in a muller. Sufficient water was added to produce an extrudable paste on a 6" extruder, ranging from 49-53% total solids. The mixture of ZSM-11, alumina, and water was extruded into ¹⁄₁₆" cylinder and then dried on a conveyor convection oven at 121° C. for several hours. The dried extrudates were pre-calcined in nitrogen at 538° C. to decompose and remove the organic template. The pre-calcined extrudates were then humidified with saturated air at ambient conditions for an hour at 2 cc/g/min. After humidification, the extrudates were exchanged with 1 N ammonium nitrate to remove sodium. The extrudates was then washed with deionized water to remove residual nitrate ions prior to drying at 121° C. for at least 4 hours. It was then calcined in air at 538° C. To a minimal amount of water was added citric acid (citric acid/Ni=2 molar) and enough nickel carbonate hydroxide tetrahydrate followed by ammonium heptamolybdate tetrahydrate to target a final loading of 3.4% Ni and 14.0% Mo, by weight, respectively. This solution was then diluted to a total volume equal to the measured water pore volume of the extruded pellets and added slowly to the pellets, which were then tumbled to ensure mixing. The impregnated pellets were dried at 121° C.

Example 2: 1:3.4% Ni/14% Mo, 80/20 ZSM-48/SiO$_2$ (MRE)

Eighty (80) parts ZSM-48 crystal were mixed 3 parts NaOH followed by 10 parts solid silica (Ultrasil™ obtainable from Evonik) and 10 parts colloidal silica (Ludox™ HS-40 obtainable from WR Grace) in a muller. Sufficient water was added to produce an extrudable paste on a 1$^{st}$ extruder, ranging from 50-60% total solids. The mixture of ZSM-48, silica, and water was extruded into ¹⁄₁₆" cylinder and then dried on a conveyor convection oven at 121° C. for several hours. The dried extrudates were pre-calcined in nitrogen at 538° C. to decompose and remove the organic template. The pre-calcined extrudates were then humidified with saturated air at ambient conditions for an hour at 2 cc/g/min. After humidification, the extrudates were exchanged with 1 N ammonium nitrate to remove sodium. The extrudates was then washed with deionized water to remove residual nitrate ions prior to drying at 121° C. for at least 4 hours. It was then calcined in air at 538° C. To a minimal amount of water was added citric acid (citric acid/Ni=2) and enough nickel carbonate hydroxide tetrahydrate followed by ammonium heptamolybdate tetrahydrate to target a final loading of 3.4% Ni and 14.0% Mo, by weight, respectively. This solution was then diluted to a total volume equal to the measured water pore volume of the extruded pellets and added slowly to the pellets, which were then tumbled to ensure mixing. The impregnated pellets were dried at 121° C.

Example 3: 3.4% Ni/14% Mo, 70/15/15 ZSM-48/ZSM-11/Al$_2$O$_3$ (MEL/MRE)

Seventy (70) parts ZSM-48 crystal were mixed with 2 parts tetraethylammonium hydroxide followed by 15 parts ZSM-11 and 15 parts solid alumina (Versal 300™) in a muller. Sufficient water was added to produce an extrudable paste on a 1" extruder, ranging from 49-53% total solids. The mixture of ZSM-48, ZSM-11, alumina, and water was extruded into ¹⁄₁₆" cylinder and then dried on a conveyor convection oven at 121° C. for several hours. The dried extrudates were pre-calcined in nitrogen at 538° C. to decompose and remove the organic template. The pre-calcined extrudates were then humidified with saturated air at ambient conditions for an hour at 2 cc/g/min. After humidification, the extrudates were exchanged with 1 N ammonium nitrate to remove sodium. The extrudates was then washed with deionized water to remove residual nitrate ions prior to drying at 121° C. for at least 4 hours. It was then calcined in air at 538° C. To a minimal amount of water was added citric acid (citric acid/Ni=2 molar) and enough nickel carbonate hydroxide tetrahydrate followed by ammonium heptamolybdate tetrahydrate to target a final loading of 3.4% Ni and 14.0% Mo, by weight, respectively. This solution was then diluted to a total volume equal to the measured water pore volume of the extruded pellets and added slowly to the pellets, which were then tumbled to ensure mixing. The impregnated pellets were dried at 121° C.

Example 4: 3.4% Ni/14% Mo, 65/35 ZSM-48/Al$_2$O$_3$, +3.4% Ni/14% Mo, 65/35 ZSM-11/Al$_2$O$_3$ (MEL+MRE)

65 parts ZSM-48 crystal were mixed with 35 parts alumina (Catapal™ 200 obtainable from Sasol North America) in a muller. Sufficient water was added to produce an extrudable paste on a 6" extruder, ranging from 49-53% total solids. The mixture of ZSM-48, alumina, and water was extruded into ⅟₁₆" cylinder and then dried on a conveyor convection oven at 121° C. for several hours. The dried extrudates were pre-calcined in nitrogen at 538° C. to decompose and remove the organic template. The pre-calcined extrudates were then humidified with saturated air at ambient conditions for an hour at 2 cc/g/min. After humidification, the extrudates were exchanged with 1 N ammonium nitrate to remove sodium. The extrudates was then washed with deionized water to remove residual nitrate ions prior to drying at 121° C. for at least 4 hours. It was then calcined in air at 538° C., followed by treatment with steam at 371° C. To a minimal amount of water was added citric acid (citric acid/Ni=2 molar) and enough nickel carbonate hydroxide tetrahydrate followed by ammonium heptamolybdate tetrahydrate to target a final loading of 3.4% Ni and 14.0% Mo, by weight, respectively. This solution was then diluted to a total volume equal to the measured water pore volume of the extruded pellets and added slowly to the pellets, which were then tumbled to ensure mixing. The impregnated pellets were dried at 121° C. The physical mixture was prepared by combining 79 parts of this ZSM-48 material with 21 parts ZSM-11 material described in Example 1, above.

Example 5: 3.4% Ni/14% Mo, 80/20 ZSM-23/Al$_2$O$_3$, (MTT)

80 parts ZSM-23 crystal were mixed with 20 parts alumina (Versal 300™) in a muller. Sufficient water was added to produce an extrudable paste on a 6" extruder, ranging from 49-53% total solids. The mixture of ZSM-23, alumina, and water was extruded into ⅟₁₆" cylinder and then dried on a conveyor convection oven at 121° C. for several hours. The dried extrudates were pre-calcined in nitrogen at 538° C. to decompose and remove the organic template. The pre-calcined extrudates were then humidified with saturated air at ambient conditions for an hour at 2 cc/g/min. After humidification, the extrudates were exchanged with 1 N ammonium nitrate to remove sodium. The extrudates was then washed with deionized water to remove residual nitrate ions prior to drying at 121° C. for at least 4 hours. It was then calcined in air at 538° C. To a minimal amount of water was added citric acid (citric acid/Ni=2 molar) and enough nickel carbonate hydroxide tetrahydrate followed by ammonium heptamolybdate tetrahydrate to target a final loading of 3.4% Ni and 14.0% Mo, by weight, respectively. This solution was then diluted to a total volume equal to the measured water pore volume of the extruded pellets and added slowly to the pellets, which were then tumbled to ensure mixing. The impregnated pellets were dried at 121° C.

Example 6: 3.4% Ni/14% Mo, 65/35 ZSM-12/Al$_2$O$_3$(MTW)

65 parts ZSM-23 crystal were mixed with 2 parts tetraethylammonium hydroxide and 15 parts alumina (Versal 300™) in a muller. Sufficient water was added to produce an extrudable paste on a 6" extruder, ranging from 49-53% total solids. The mixture of ZSM-12, alumina, and water was extruded into ⅟₁₆" cylinder and then dried on a conveyor convection oven at 121° C. for several hours. The dried extrudates were pre-calcined in nitrogen at 538° C. to decompose and remove the organic template. The pre-calcined extrudates were then humidified with saturated air at ambient conditions for an hour at 2 cc/g/min. After humidification, the extrudates were exchanged with 1 N ammonium nitrate to remove sodium. The extrudates was then washed with deionized water to remove residual nitrate ions prior to drying at 121° C. for at least 4 hours. It was then calcined in air at 538° C. To a minimal amount of water was added citric acid (citric acid/Ni=2 molar) and enough nickel carbonate hydroxide tetrahydrate followed by ammonium heptamolybdate tetrahydrate to target a final loading of 3.4% Ni and 14.0% Mo, by weight, respectively. This solution was then diluted to a total volume equal to the measured water pore volume of the extruded pellets and added slowly to the pellets, which were then tumbled to ensure mixing. The impregnated pellets were dried at 121° C.

Example 7: 3.4% Ni/14% Mo, 40/40/20 ZSM-48/ZSM-23/Al$_2$O$_3$ (40/40 MRE/MTT)

40 parts ZSM-48 crystal were mixed 40 parts ZSM-23 then 2 parts tetraethylammonium hydroxide and 15 parts alumina (Versal 300™) were added to a muller. Sufficient water was added to produce an extrudable paste on a 6" extruder, ranging from 49-55% total solids. The mixture of ZSM-48, ZSM-23, alumina, and water was extruded into ⅟₁₆" cylinder and then dried on a conveyor convection oven at 121° C. for several hours. The dried extrudates were pre-calcined in nitrogen at 538° C. to decompose and remove the organic template. The pre-calcined extrudates were then humidified with saturated air at ambient conditions for an hour at 2 cc/g/min. After humidification, the extrudates were exchanged with 1 N ammonium nitrate to remove sodium. The extrudates was then washed with deionized water to remove residual nitrate ions prior to drying at 121° C. for at least 4 hours. It was then calcined in air at 538° C. To a minimal amount of water was added citric acid (citric acid/Ni=2 molar) and enough nickel carbonate hydroxide tetrahydrate followed by ammonium heptamolybdate tetrahydrate to target a final loading of 3.4% Ni and 14.0% Mo, by weight, respectively. This solution was then diluted to a total volume equal to the measured water pore volume of the extruded pellets and added slowly to the pellets, which were then tumbled to ensure mixing. The impregnated pellets were dried at 121° C.

Example 8: 1.7% Ni/7.0% Mo, 65/15/20 ZSM-48/ZSM-23/Al$_2$O$_3$ (½ NiMo 40/40 MRE/MTT)

Example 8 was prepared using the same methods as Example 7, except with a final loading of 1.7% Ni and 7.0% Mo, by weight, respectively.

Example 9: 3.4% Ni/14% Mo, 65/15/20 ZSM-48/ZSM-23/Al$_2$O$_3$ (65/15 MRE/MTT)

Example 9 was prepared using the same methods as Example 7, except with 65 parts ZSM-48 crystal and 15 parts ZSM-23 crystal.

Example 10: 3.4% Ni/14% Mo, 15/65/20 ZSM-48/ZSM-23/Al$_2$O$_3$ (15/65 MRE/MTT)

Example 10 was prepared using the same methods as Example 7, except with 15 parts ZSM-48 crystal and 65 parts ZSM-23 crystal.

Example 11: 3.4% Ni/14% Mo, 40/40/20 ZSM-48/ZSM-12/Al$_2$O$_3$ (40/40 MRE/MTW)

Example 11 was prepared using the same methods as Example 7, except with 40 parts ZSM-48 crystal and 40 parts ZSM-12 crystal.

Example 12: Performance Evaluations

The properties of the feeds used in the performance evaluation of the catalysts in the Examples above are shown in Table 1.

TABLE 1

Example feed properties.

| Description | Feed 1 | Feed 2 |
|---|---|---|
| API Gravity | 35.98 | 28.95 |
| Sulfur, wt % | 1.14 | 1.02 |
| Nitrogen, ppm | 112.9 | 438 |
| Hydrogen, wt % | 13.08 | 12.36 |
| Pour Point - OptiMPP, ° C. | −6.0 | 10.0 |
| Cloud Point - OptiMPP, ° C. | −1.9 | 12.4 |
| PARAFFINS, wt % | 39.58 | 22.18 |
| TOTAL NAPHTHENES, wt % | 28.76 | 30.94 |
| TOTAL AROMATICS, wt % | 31.65 | 46.88 |
| GCD (gas chromatogram) | ° F./° C. | ° F./° C. |
| Simulated distillation per ASTM D2887 IBP (initial boiling) point | 285.1/140.6 | 285.6/140.9 |
| 5% | 407.6/208.7 | 416.5/213.6 |
| 50% | 577.9/303.3 | 669.2/354 |
| 95% | 729.2/387.3 | 803.0/428.3 |
| 98% | 756.6/402.6 | 825.0/440.6 |
| FBP (final boiling point) | 788.6/420.3 | 853.6/456.4 |

Catalysts were loaded in a typical trim dewaxing configuration, with a 80% v/v (Volume of 1$^{st}$ bed catalyst/Total Volume of 1$^{st}$ bed and 2$^{nd}$ bed) first bed of hydrotreating catalyst followed by a 20% v/v second bed of dewaxing catalyst. Reactors were run in a downflow configuration, with offgas monitored by a wet test meter and GC. Total liquid product was also collected and tested for simulated distillation and residual organic sulfur and nitrogen. Material balances were all closed to 100±3%. All catalysts were sulfided in the unit using 3% sulfur-spiked LVGO (light vacuum gas oil) prior to real feed exposure. Testing was completed using lined out catalyst, and the conditions for both feeds are listed in Tables 2-4. Cloud points were averaged across each condition. For all materials run using conditions from Table 2, product nitrogen values were undetectable for all balances.

The Condition Set 1 for testing temperature dependence of cloud point reduction on Feed 1 is shown in Table 2.

TABLE 2

| CONDITION | 1 | 2 | 3 |
|---|---|---|---|
| Temp [° C.] | 335 | 355 | 371 |
| Pressure [barg] | 46 | 46 | 46 |
| All Liners, LHSV [1/h] | 0.55 | 0.55 | 0.55 |
| Treat Gas Rate [SCF/bbl] | 1600 | 1600 | 1600 |
| Treat Gas Composition, H$_2$ mol. % | 100% | 100% | 100% |

The Condition Set 2 for testing temperature dependence of cloud point reduction on Feed 2 is shown in Table 3.

TABLE 3

| CONDITION | 1 | 2 | 3 |
|---|---|---|---|
| Temp [C.] | 350 | 365 | 388 |
| Pressure [barg] | 94 | 94 | 94 |
| All Liners, LHSV [1/h] | 0.7 | 0.7 | 0.7 |
| Treat Gas Rate [SCF/bbl] | 2400 | 2400 | 2400 |
| Treat Gas Composition, H$_2$ mol. % | 100% | 100% | 100% |

The results of the performance evaluation of the catalysts of the Examples is shown in FIGS. 1 to 8.

FIG. 1 shows the cloud point reduction performance of materials containing MEL and MRE (10MR) frameworks over a range of temperatures using Feed 1 under Condition Set 1. Specifically, FIG. 1 shows the performance of materials containing MEL and MRE frameworks alone, along with their physical mixture (MEL+MRE) and co-extruded (MEL/MRE) forms. As can be seen, in terms of cloud point reduction on Feed 1, the co-extruded material (MEL/MRE) demonstrated significantly increased activity over the physically mixed sample (MEL+MRE), especially at higher temperatures. This co-extruded material also outperforms either of the individual materials containing MEM and MRE frameworks alone.

Figure 2:
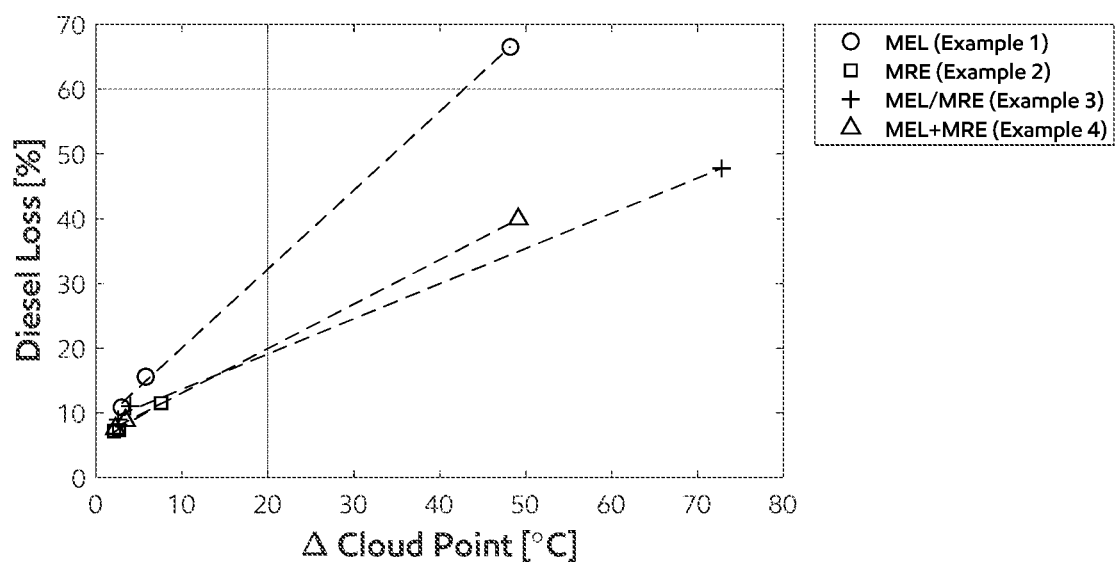
FIG. 2 shows the diesel loss versus cloud point reduction for materials containing MEL and MRE (10MR) frameworks.

A common concern with high activity materials is their tendency to crack diesel range molecules into light ends, resulting in diesel loss, which is economically undesirable. FIG. 2 shows the diesel loss versus cloud point reduction on Feed 1 under Condition Set 1 for materials containing MEL and MRE frameworks. FIG. 2 reveals that not only does the co-extruded material containing MEL/MRE frameworks demonstrate increased activity over a range of temperatures, but it also has improved diesel yield compared to the other materials which contain MEL frameworks only or MRE frameworks only or a physical mixture of MEL+MRE frameworks.

Figure 3:
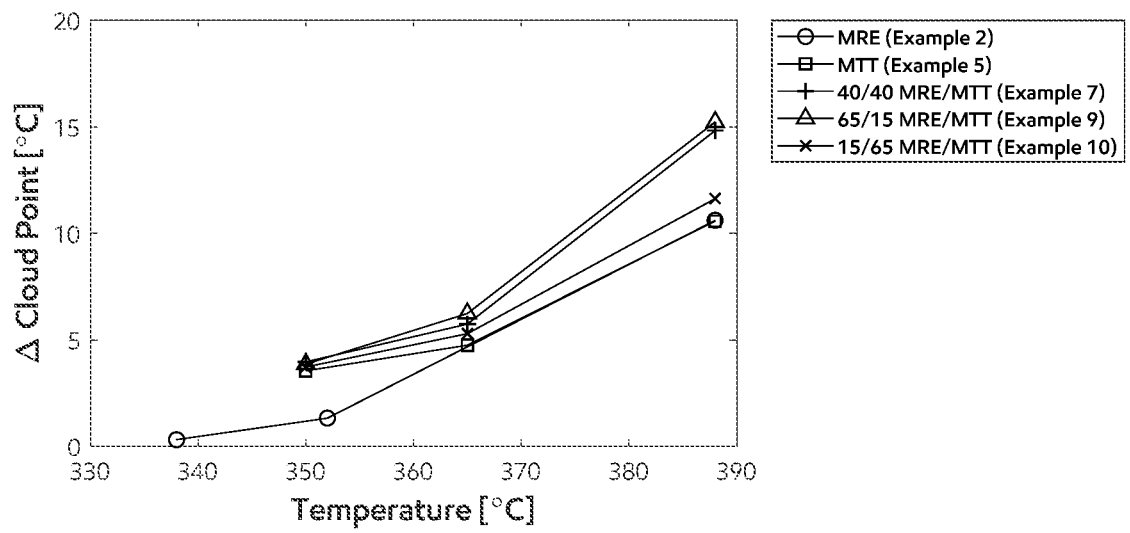
FIG. 3 shows the cloud point reduction performance of materials containing MTT and MRE (10MR) frameworks over a range of temperatures.

FIG. 3 shows the cloud point reduction performance of materials containing MTT and MRE (10MR) frameworks over a range of temperatures on Feed 2 under Condition Set 2. Specifically, co-extruded materials containing MTT and MRE frameworks (10MR) were tested over a range of MRE/MTT ratios. The increased activity for coextruded materials is not limited to MEL and MRE (10MR) frameworks or to Feed 1, as can be seen from FIG. 3. The cloud point reduction performance can be tuned by selectively differing catalysts ratios. In this study, 65/15 and 40/40 MRE/MTT demonstrate higher activity that either material containing MTT or MRE alone, while the material containing more of the less active MTT component was less active than MRE alone.

Figure 4:
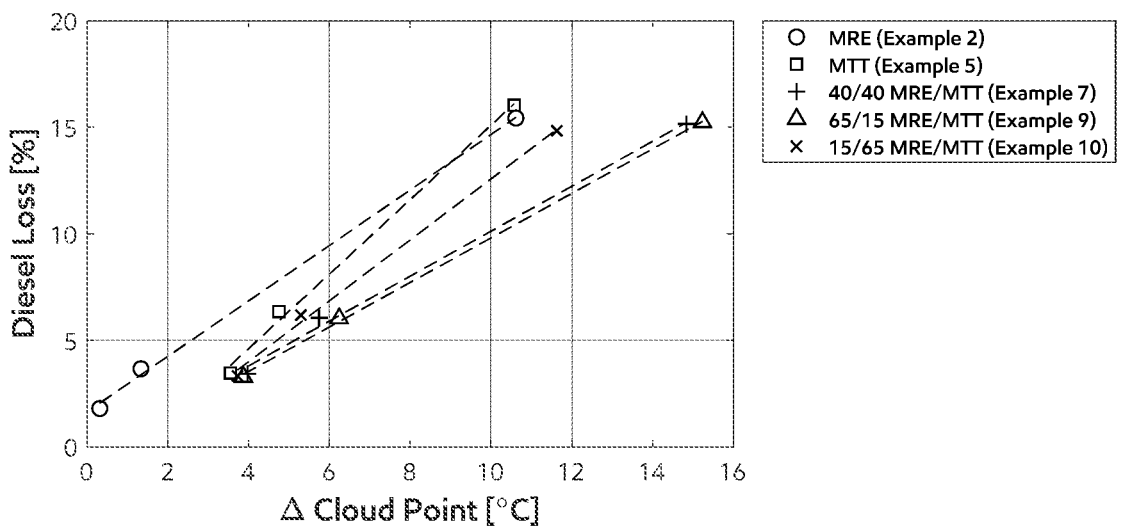
FIG. 4 shows the diesel loss versus cloud point reduction for materials containing MTT and MRE (10MR) frameworks.

FIG. 4 shows the diesel loss versus cloud point reduction on Feed 2 under Condition Set 2 for materials containing MTT and MRE (10MR) frameworks. Similar to the co-extruded materials containing MEL/MRE (10MR) frameworks, the materials containing MRE/MTT frameworks all show lower diesel loss and therefore improved selectivity for isomerization over cracking compared to the parent materials. This again demonstrates the advantage of co-extruded materials having a single MEL framework material or a single MRE framework material or a single MTT (10 MR) framework material.

Figure 5:
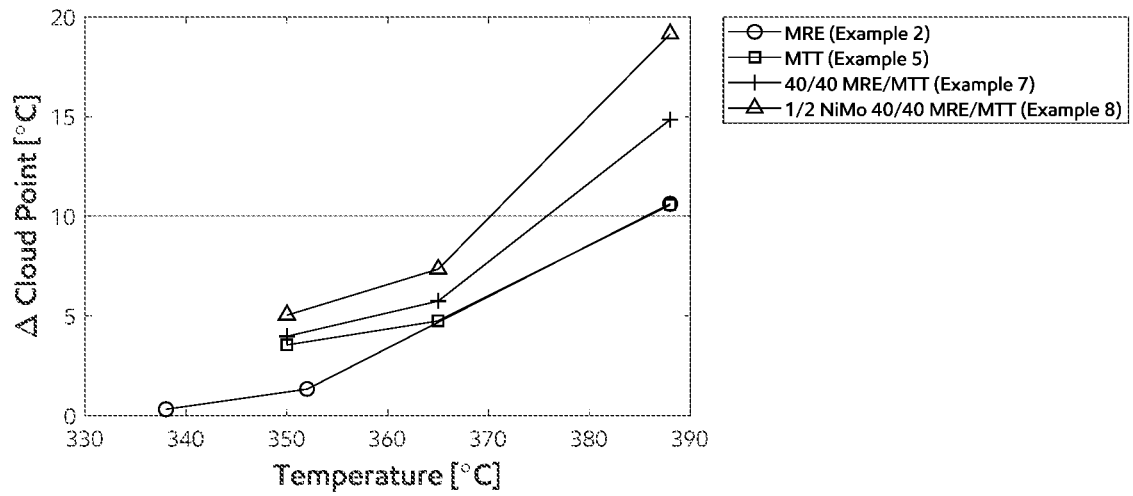
FIG. 5 shows the cloud point reduction performance of materials containing MTT and MRE (10MR) frameworks with varied metal loadings over a range of temperatures.
Figure 6:
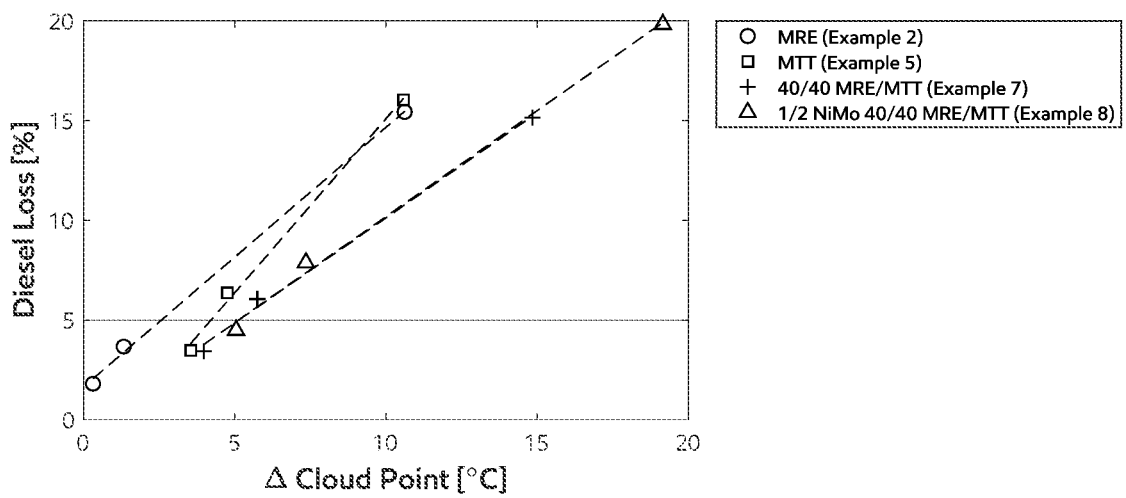
FIG. 6 shows the diesel loss versus cloud point reduction for materials containing MTT and MRE (10MR) frameworks with varied metal loadings.

In addition to different frameworks and feeds, this methodology of co-extruding zeolites can also be combined with different metal components. FIG. 5 shows the cloud point reduction performance of materials containing MTT and MRE (10MR) frameworks with varied metal loadings over a range of temperatures on Feed 2 under Condition Set 2. FIG. 6 shows the diesel loss versus cloud point reduction on Feed 2 under Condition Set 2 for materials containing MTT and MRE (10MR) frameworks with varied metal loadings. FIGS. 5 and 6 display the increased activity of the co-extruded 40 MRE/40 MTT materials with the Ni/Mo metal loading reduced by 50% (from 3.4% Ni/14% Mo to 1.7% Ni/7.0% Mo, each by weight). As can be seen in these FIGS. 5 and 6, the increased activity and selectivity MTT and MRE (10MR) frameworks with 50% metal loadings are nearly identical to the 100% relative metal catalyst for the same MTT and MRE (10MR) frameworks, which is also improved over either materials containing a single MTT framework or a single MRE framework.

Figure 7:
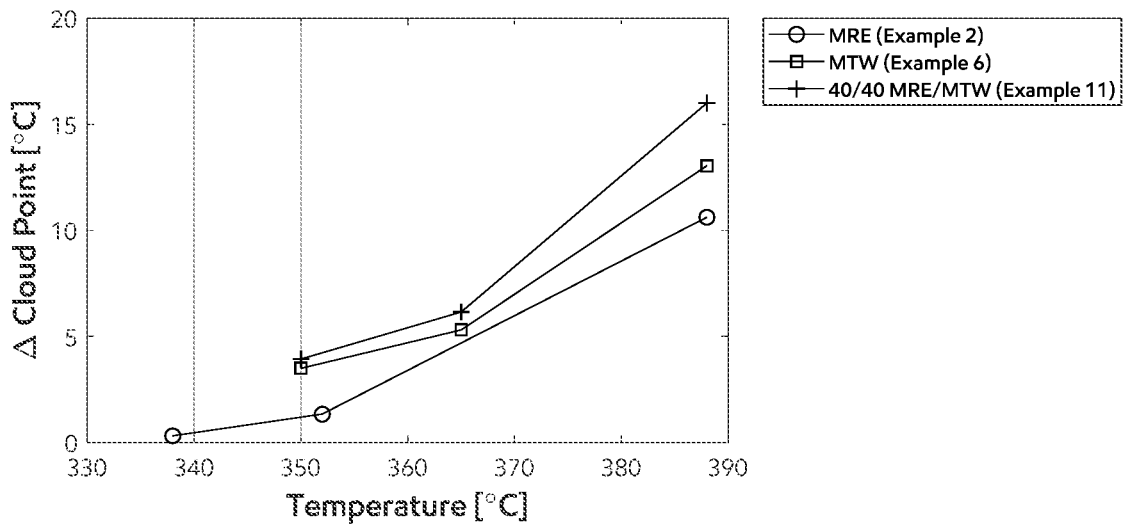
FIG. 7 shows the cloud point reduction performance of materials containing MTW (framework 12MR) and MRE (10MR) frameworks over a range of temperatures.
Figure 8:
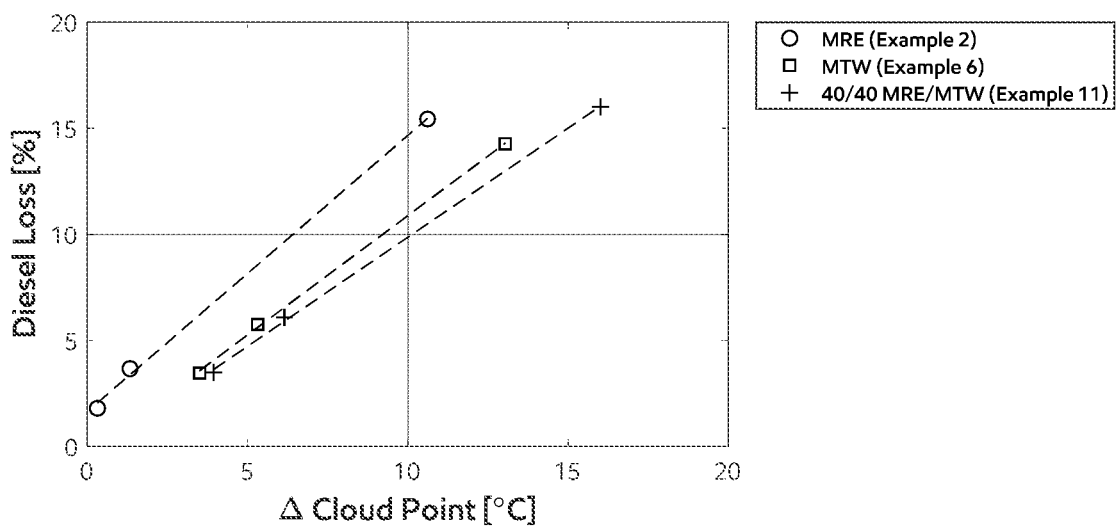
FIG. 8 shows the diesel loss versus cloud point reduction for materials containing MTW (12MR) and MRE (10MR) containing materials.

FIG. 7 shows the cloud point reduction performance of materials containing MTW (12MR) framework and MRE (10 MR) framework over a range of temperatures on Feed 2 under Condition Set 2. FIG. 8 shows the diesel loss versus cloud point reduction on Feed 2 under Condition Set 2 for materials containing MTW (12MR) and MRE (10MR) frameworks. In the case of materials containing a combination of MTW and MRE frameworks, equivalent activity was observed between a material containing MTW (12MR) framework alone and a co-extrusion of materials containing a MRE/MTW (FIG. 7); however, the coextruded material demonstrated 1% improvement in diesel yield compared to MTW alone (FIG. 8). This demonstrates the advantage of co-extruding materials having multiple framework materials instead of using a single frameworks.

Not to be bound by any theory, it is believed that making a dewaxing catalyst made by co-extruding different framework materials results in more intimate mixing and improved homogeneity of the framework materials (and optionally a binder) thereby providing better access to the acid sites in the catalyst and exhibiting increase cloud point reduction with undue increase in diesel loss in dewaxing processes.

All priority documents, patents, publications, and patent applications, test procedures (such as ASTM methods), and other documents cited herein are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art which the invention pertains.

What is claimed is:

1. A process for trim dewaxing a distillate boiling range feed, comprising:
   contacting at least a portion of a distillate boiling range feed with a dewaxing catalyst under effective dewaxing conditions to form an a diesel boiling range product, the dewaxing catalyst includes
   (a) a co-extrusion of two different zeolites selected from two different 10-membered ring zeolites, or a 10-membered ring zeolite and a 12-membered ring zeolite, and
   (b) a metal hydrogenation component comprising a first metal selected from the group consisting of nickel, cobalt and mixtures thereof, and a second metal selected from the group consisting of chromium, molybdenum, tungsten and mixtures thereof.

2. The process of claim 1, further comprising the step of contacting the portion of the distillate boiling range feed to a hydrotreating catalyst under hydrotreating conditions.

3. The process of claim 2, wherein the hydrotreating catalyst and the dewaxing catalyst are arranged in fluid communication in a stacked bed of catalyst or are comingled in a mixed bed of catalyst, or a combination thereof.

4. The process of claim 1, wherein the effective dewaxing conditions comprise a temperature of at least about 300° C.

5. A method comprising:
   (a) forming a mixture which comprises a first zeolite, a second zeolite and a binder, wherein the first zeolite and the second zeolite are two different zeolites;
   (b) mulling the mixture to form an extrudable paste;
   (c) extruding the extrudable paste to form an extrudate; and
   (c) drying the extrudate at a temperature of about 80° C. to about 200° C. to form a dried extrudate;
   (d) impregnating the dried extrudate with a solution comprising a source of a metal hydrogenation component; and
   (e) drying the metal-containing extrudate at a temperature of about 80° C. to about 200° C. to form a dewaxing catalyst, wherein the dewaxing catalyst includes
   (a) a co-extrusion of the two different zeolites selected from two different 10-membered ring zeolites, or a 10-membered ring zeolite and a 12-membered ring zeolite, and
   (b) the metal hydrogenation component comprising a first metal selected from the group consisting of nickel, cobalt and mixtures thereof, and a second metal selected from the group consisting of chromium, molybdenum, tungsten and mixtures thereof.

6. The method of claim 5, wherein the mixture further comprises water, wherein the solids content of the extrudable paste is from about 45% to 55% by weight.

7. The method of claim 5, wherein the mixture further comprises an extrusion aid, the extrusion aid selected from the group consisting of tetraethylammonium hydroxide, citric acid, sodium hydroxide, nitric acid, and mixtures thereof.

8. The method of any one of claim 5, wherein the dewaxing catalyst is sulfided.

9. The method of claim 5, wherein the dewaxing catalyst is exchanged with a source of ammonium ions, washed with water, dried and calcined.

10. A dewaxing catalyst, comprising:
(a) a co-extrusion of two different zeolites selected from two different 10-membered ring zeolites, or a 10-membered ring zeolite and a 12-membered ring zeolite; and
(b) a metal hydrogenation component comprising a first metal selected from the group consisting of nickel, cobalt and mixtures thereof, and a second metal selected from the group consisting of chromium, molybdenum, tungsten and mixtures thereof.

11. The catalyst of claim 10, wherein the 10-membered ring zeolite has a framework type selected from the group consisting of EUO, MEL, MFI, MFS, MRE, MTT, MWW, MWW, NES, TON and mixtures thereof.

12. The catalyst of claim 10, wherein the 10-membered ring zeolite is selected from the group consisting ZSM-50, EU-1, ZSM-11, ZSM-5, ZSM-57, ZSM-48, ZSM-23, EMM-10, EMM-12, EMM-13, MCM-22, MCM-36, MCM-49, MCM-56, NU-87, ZSM-22, Theta-1, and mixtures thereof.

13. The catalyst of claim 10, wherein the 12-membered ring zeolite has a framework type selected from the group consisting of *BEA, BEC, EMT, FAU, LTL, MEI, MOR, MOZ, MTW, MSE, OFF and mixtures thereof.

14. The catalyst of claim 10, wherein the 12-membered ring zeolite is selected from the group consisting of beta, ZSM-2, ZSM-3, ZSM-20, Y, US-Y, L, ZSM-18, mordenite, ZSM-10, ZSM-12, MCM-68, offretite, and mixtures thereof.

15. The catalyst of claim 10, wherein the co-extrusion of two different zeolites is a co-extrusion of ZSM-11 and ZSM-48, or a co-extrusion of ZSM-23 and ZSM-48, or a co-extrusion of ZSM-48 and ZSM-12.

16. The catalyst of claim 10, wherein the first metal is nickel or cobalt, and the second metal is molybdenum.

17. The catalyst of claim 10, further comprising a binder, the binder comprising alumina, silica, silica-alumina, zirconia, titania, or mixtures thereof.

18. The catalyst of claim 10, wherein the two different zeolites comprise a 10-membered ring zeolite and a 12-membered ring zeolite.

* * * * *